US012794509B2

(12) United States Patent
Zhang et al.

(10) Patent No.: US 12,794,509 B2
(45) Date of Patent: Nov. 10, 2026

(54) WIDEBAND PRECODING RESOURCE GROUP ACROSS DOWNLINK SUBBANDS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 481 days.

(21) Appl. No.: 18/331,889

(22) Filed: Jun. 8, 2023

(65) Prior Publication Data

US 2024/0413852 A1 Dec. 12, 2024

(51) Int. Cl.

| | |
|---|---|
| ***H04B 1/69*** | (2011.01) |
| ***H04L 5/14*** | (2006.01) |
| ***H04W 8/24*** | (2009.01) |
| ***H04W 72/0453*** | (2023.01) |

(52) U.S. Cl.

CPC ................. *H04B 1/69* (2013.01); *H04L 5/14* (2013.01); *H04W 8/24* (2013.01); *H04W 72/0453* (2013.01)

(58) Field of Classification Search

None

See application file for complete search history.

(56) References Cited

U.S. PATENT DOCUMENTS

| | | | | |
|---|---|---|---|---|
| 12,500,635 B2 * | 12/2025 | Gao | ..................... | H04B 7/0456 |
| 2008/0233902 A1 * | 9/2008 | Pan | ..................... | H04B 7/0654 375/296 |
| 2012/0069757 A1 * | 3/2012 | Jiang | ..................... | H04J 11/0033 370/252 |

(Continued)

FOREIGN PATENT DOCUMENTS

WO 2024107496 A1 5/2024

OTHER PUBLICATIONS

International Search Report and Written Opinion—PCT/US2024/028267—ISA/EPO—Sep. 10, 2024.

(Continued)

*Primary Examiner* — Otis L Thompson, Jr.

(74) *Attorney, Agent, or Firm* — Procopio, Cory, Hargreaves & Savitch

(57) ABSTRACT

Method and apparatus for wideband PRG across a plurality of downlink subbands. The apparatus transmits, to a network entity, a UE capability indicating support for at least wideband PRG with non-contiguous frequency resources across a plurality of downlink subbands. The apparatus communicates with the network entity based on the wideband PRG. The apparatus may process each downlink subband separately without joint decoding in response to the UE capability indicating the support for the different precoding across the plurality of downlink subbands. The apparatus may process each downlink subband with joint decoding in response to the UE capability indicating the support for the same precoding across the plurality of downlink subbands.

(Continued)

The apparatus may receive, from the network entity, a precoding indication indicating that the precoding across the plurality of downlink subbands is different or the same.

29 Claims, 13 Drawing Sheets

(56) References Cited

U.S. PATENT DOCUMENTS

| | | | | |
|---|---|---|---|---|
| 2012/0069833 | A1* | 3/2012 | Molnar | H04L 1/0045 370/342 |
| 2012/0250558 | A1* | 10/2012 | Chung | H04L 5/0098 370/252 |
| 2016/0211895 | A1* | 7/2016 | Onggosanusi | H04L 25/03955 |
| 2019/0020389 | A1* | 1/2019 | Liu | H04B 7/06 |
| 2019/0379437 | A1* | 12/2019 | Park | H04L 27/2636 |
| 2020/0145974 | A1* | 5/2020 | Rico Alvarino | H04W 72/23 |
| 2020/0404664 | A1* | 12/2020 | Chae | H04L 5/1423 |
| 2021/0083735 | A1* | 3/2021 | Sundararajan | H04L 5/0017 |
| 2021/0092558 | A1* | 3/2021 | Duan | H04L 25/03343 |
| 2021/0127408 | A1* | 4/2021 | Huang | H04W 72/1268 |
| 2021/0160913 | A1* | 5/2021 | Jiang | H04B 7/0417 |
| 2023/0040860 | A1* | 2/2023 | Yuan | H04B 7/0456 |
| 2023/0336225 | A1* | 10/2023 | Shahmohammadian | H04L 5/005 |
| 2024/0283603 | A1* | 8/2024 | Awadin | H04L 5/0001 |
| 2024/0291529 | A1* | 8/2024 | Lee | H04B 7/0639 |
| 2024/0340153 | A1* | 10/2024 | Zhang | H04W 72/0446 |
| 2024/0380461 | A1* | 11/2024 | Ibrahim | H04L 5/14 |
| 2024/0381352 | A1* | 11/2024 | Abdelghaffar | H04W 72/1273 |
| 2025/0125841 | A1* | 4/2025 | Huang | H04L 5/0023 |

OTHER PUBLICATIONS

Moderator (CATT): "Summary #2 of subband non-overlapping full duplex", R1-2306074, 3rd Generation Partnership Project, Mobile Competence Centre, 650, Route Des Lucioles, F-06921 Sophia-antipolis Cedex, France, vol. RAN WG1, No. Incheon, Korea, May 22, 2023-May 26, 2023, May 24, 2023, XP052490838, 78 Pages, p. 10-p. 31.

* cited by examiner

WIDEBAND PRECODING RESOURCE GROUP ACROSS DOWNLINK SUBBANDS

TECHNICAL FIELD

The present disclosure relates generally to communication systems, and more particularly, to a configuration for wideband precoding resource group (PRG) across downlink subbands.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits, to a network entity, a UE capability indicating support for at least wideband precoding resource group (PRG) with non-contiguous frequency resources across a plurality of downlink subbands. The apparatus communicates with the network entity based on the wideband PRG.

In an aspect of the disclosure, a method, a computer-readable medium, and an apparatus are provided. The apparatus may be a device at a network node. The device may be a processor and/or a modem at a network node or the network node itself. The apparatus obtains, from a user equipment (UE), a UE capability indicating support for at least wideband precoding resource group (PRG) with non-contiguous frequency resources across a plurality of downlink subbands. The apparatus communicates with the UE based on the wideband PRG.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
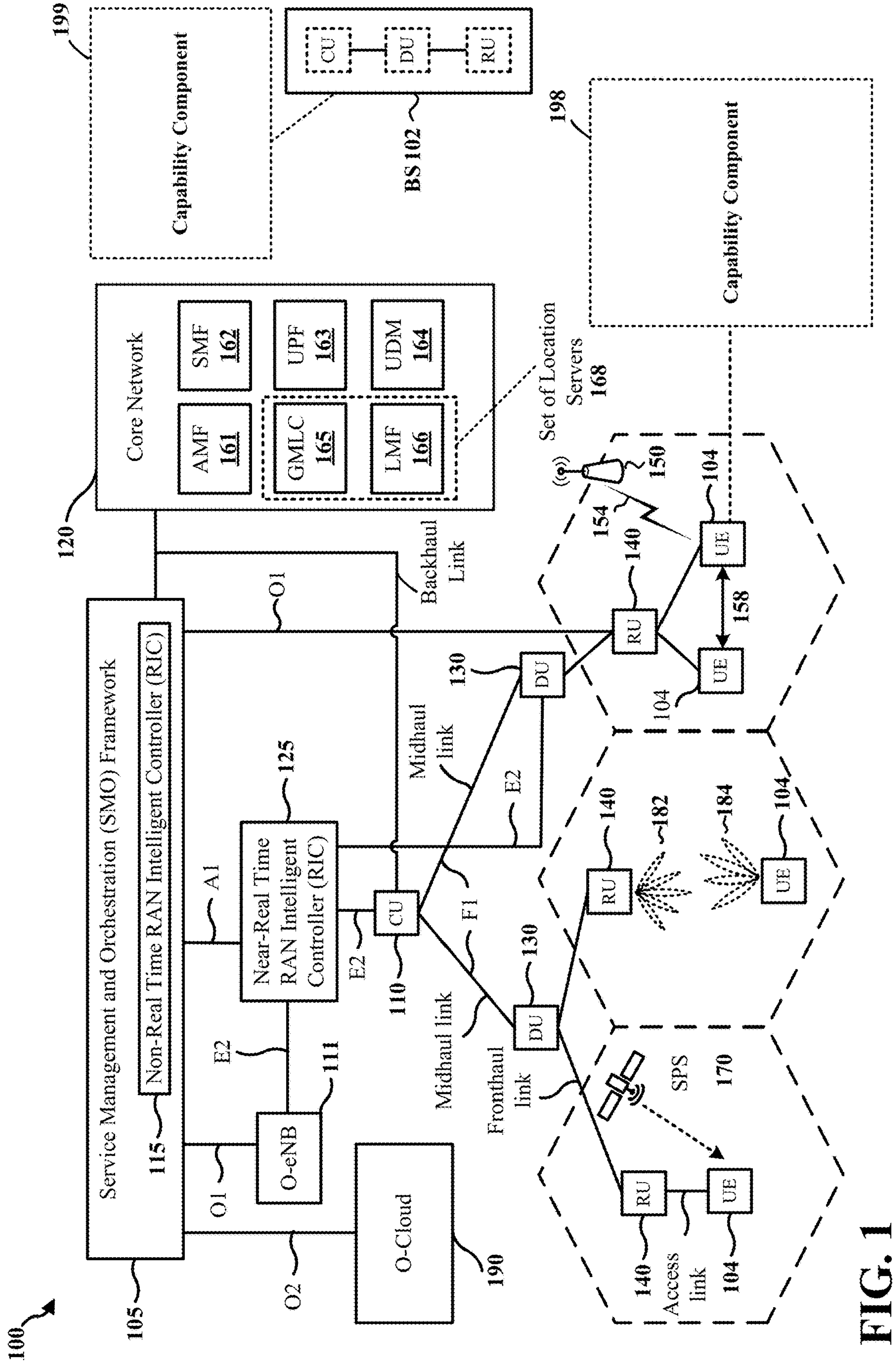
FIG. 1 is a diagram illustrating an example of a wireless communications system and an access network.

Wireless communication systems may be configured to share available system resources and provide various telecommunication services (e.g., telephony, video, data, messaging, broadcasts, etc.) based on multiple-access technologies that support communication with multiple users. Full duplex operation, in which a wireless device exchanges uplink and downlink communication that overlaps in time, may enable more efficient use of the wireless spectrum. Full duplex operation may include simultaneous transmission and reception in the same frequency range. Full duplex communication may reduce latency. As one example, full duplex operation may enable a base station to transmit a downlink signal in an uplink-only slot, which can reduce the latency for the downlink communication.

In some instances, a precoding resource group (PRG) may be determined to be a wideband PRG. In some instances, non-contiguous frequency resources across downlink subbands may be allocated which comprise contiguous frequency resources within each downlink subband. Wideband precoding may occur within each downlink subband. In some instances, non-contiguous frequency resources across downlink subbands may not be allocated, such that only contiguous PRBs (e.g., single subband scheduling) when wideband DMRS precoding is utilized.

Aspects presented herein provide a configuration for wideband PRG across downlink subbands. For example, a UE may transmit a UE capability indicating support for at least wideband PRG with non-contiguous frequency resources across a plurality of downlink subbands. In some instances, the UE capability may indicate support for wideband PRG with the non-contiguous frequency resources across the plurality of downlink subbands where each of the plurality of downlink subbands comprise contiguous frequency resources.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a capability component 198 that may be configured to transmit, to a network entity, a UE capability indicating support for at least wideband PRG with non-contiguous frequency resources across a plurality of downlink subbands; and communicate with the network entity based on the wideband PRG.

Referring again to FIG. 1, in certain aspects, the base station 102 may comprise a capability component 199 that may be configured to obtain, from a UE, a UE capability indicating support for at least wideband PRG with non-contiguous frequency resources across a plurality of downlink subbands; and communicate with the UE based on the wideband PRG.

Although the following description may be focused on 5G NR, the concepts described herein may be applicable to other similar areas, such as LTE, LTE-A, CDMA, GSM, and other wireless technologies.

Figures 2A, 2B, 2C, 2D:
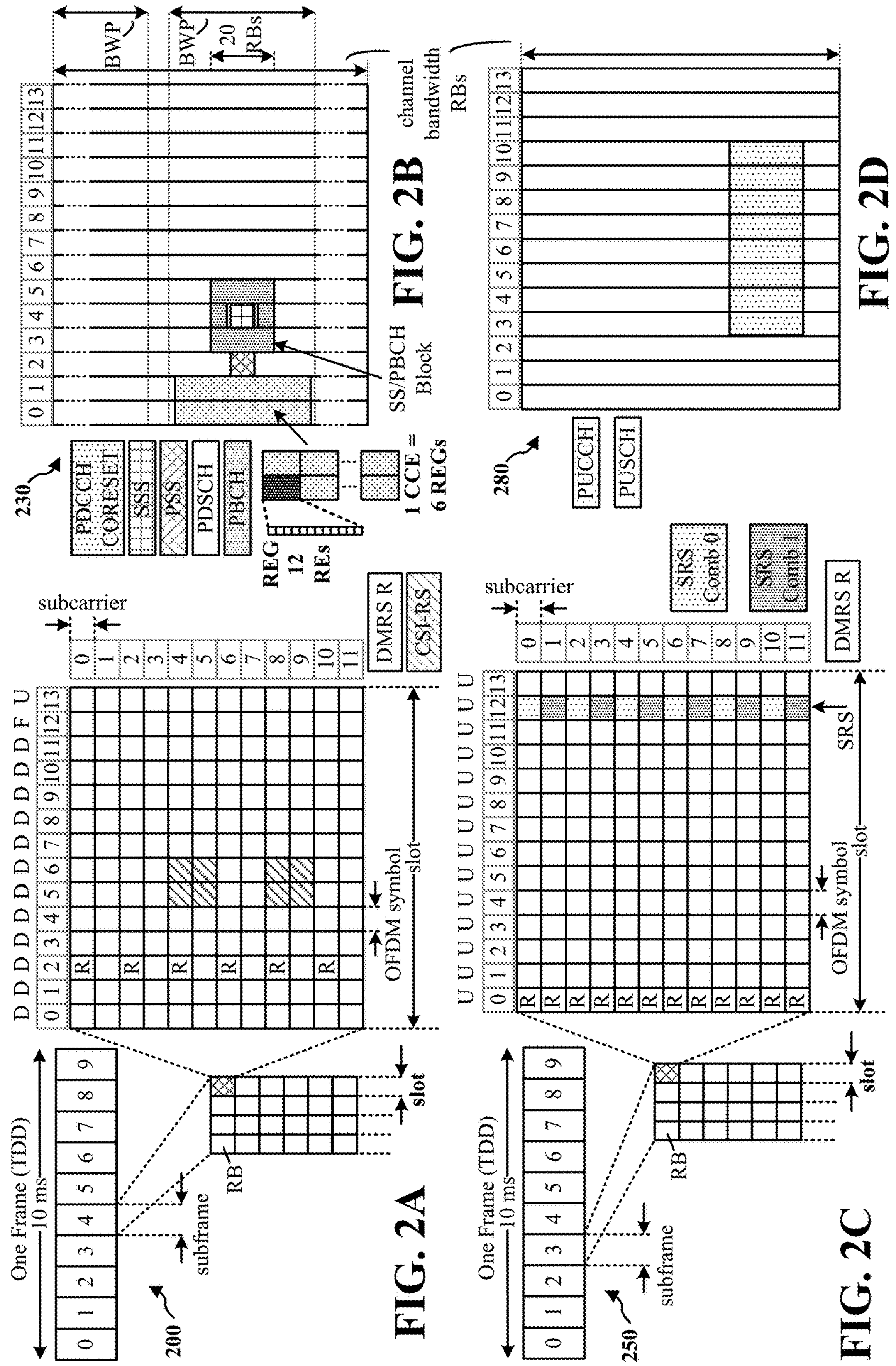
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
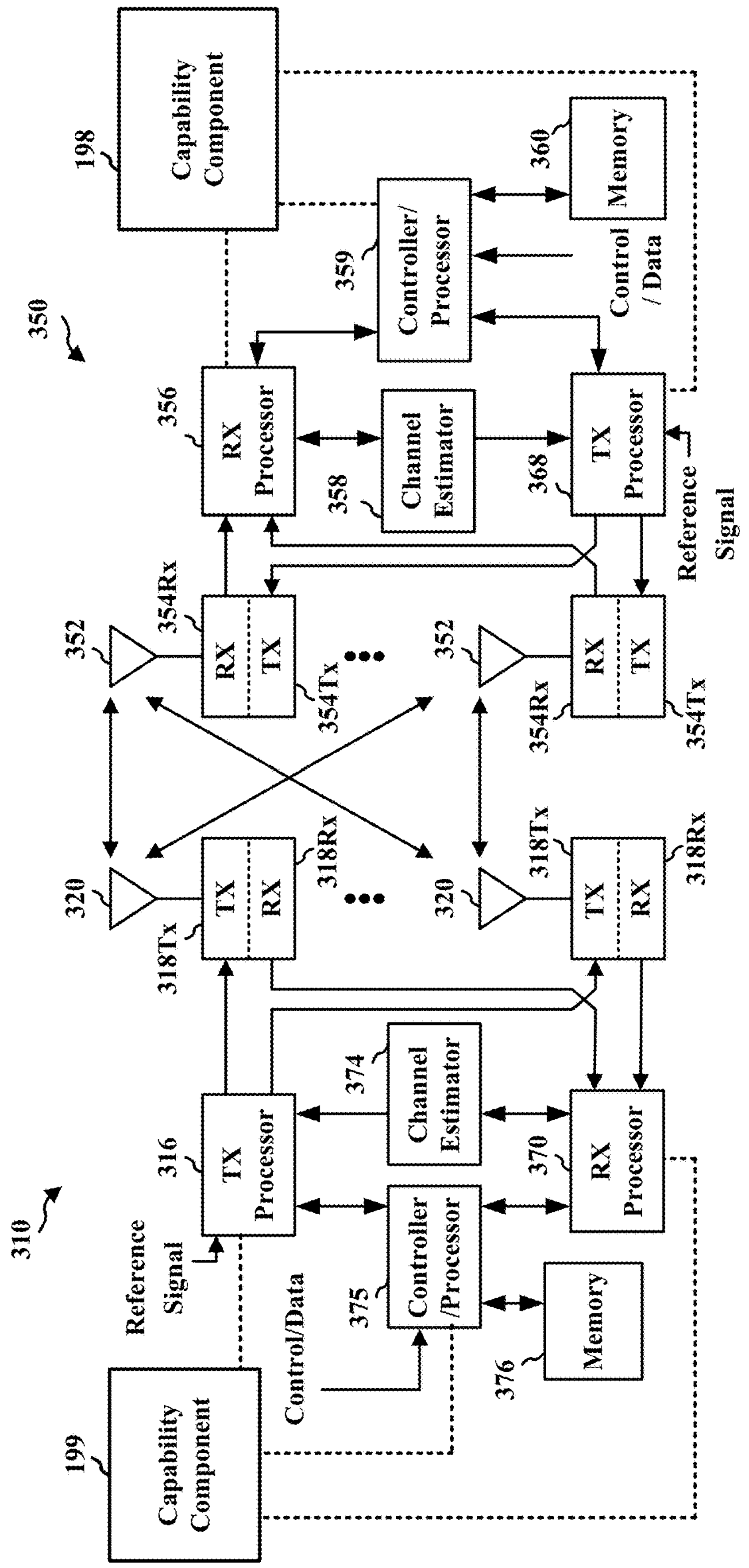
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the capability component 198 of FIG. 1.

At least one of the TX processor 316, the RX processor 370, and the controller/processor 375 may be configured to perform aspects in connection with the capability component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation, in which a wireless device exchanges uplink and downlink communication that overlaps in time, may enable more efficient use of the wireless spectrum. Full duplex operation may include simultaneous transmission and reception in the same frequency range. In some examples, the frequency range may be an mmW frequency range, e.g., frequency range 2 (FR2). In some examples, the frequency range may be a sub-6 GHz frequency range, e.g., frequency range 1 (FR1). Full duplex communication may reduce latency. As one example, full duplex operation may enable a base station to transmit a downlink signal in an uplink-only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A, 4B, 4C, and 4D illustrate various modes of full duplex communication. Full duplex communication supports the transmission and reception of information over the same frequency band in a manner that overlaps in time. In this manner, spectral efficiency may be improved with respect to the spectral efficiency of half-duplex communication, which supports the transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver and/or experienced as clutter from a reflection of the transmitted signal (e.g., due to a reflection from a physical object) that is received as interference to the receiver. In addition, the UE or base station may also experience interference from other devices, such as transmissions from a second UE or a second base station. Such interference (e.g., self-interference or interference caused by other devices) may impact the quality of the communication or even lead to a loss of information.

Figure 4A:
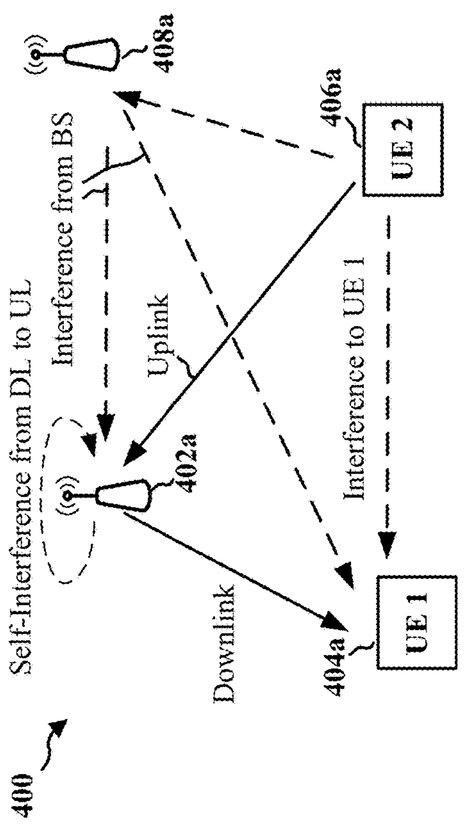
FIGS. 4A, 4B, 4C, and 4D illustrate various modes of full duplex communication.

FIG. 4A shows the first example of full duplex communication 400 in which a first base station 402*a* is in full duplex communication with a first UE 404*a* and a second UE 406*a*. The first UE 404*a* and the second UE 406*a* may be configured for half-duplex communication or full-duplex communication. FIG. 4A illustrates the first UE 404*a* performing downlink reception, and the second UE 406*a* performing uplink transmission. The second UE 406*a* may transmit a first uplink signal to the first base station 402*a* as well as to other base stations, such as a second base station 408*a* in proximity to the second UE 406*a*. The first base station 402*a* transmits a downlink signal to the first UE 404*a* concurrently (e.g., overlapping at least partially in time) with receiving the uplink signal from the second UE 406*a*. The base station 402*a* may experience self-interference at its receiving antenna that is receiving the uplink signal from UE 406*a*, the self-interference being due to reception of at least part of the downlink signal transmitted to the UE 404*a*. The base station 402*a* may experience additional interference due to signals from the second base station 408*a*. Interference may also occur at the first UE 404*a* based on signals from the second base station 408*a* as well as from uplink signals from the second UE 406*a*.

Figure 4B:
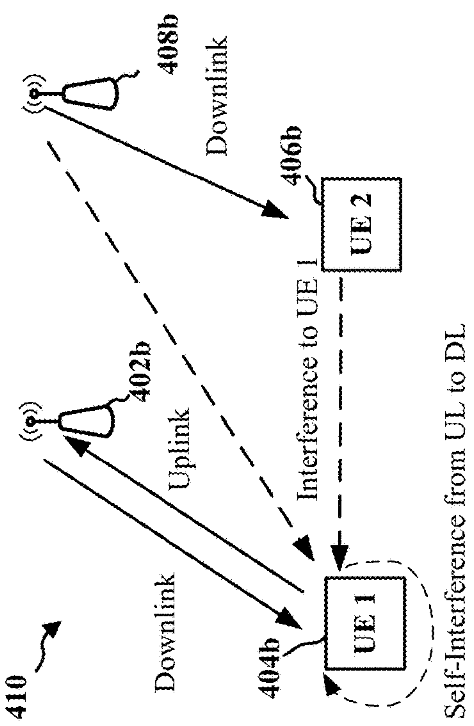

FIG. 4B shows the second example of full-duplex communication 410 in which a first base station 402*b* is in full-duplex communication with a first UE 404*b*. In this example, the UE 404*b* is also operating in a full-duplex mode. The first base station 402*b* and the UE 404*b* receive and transmit communication that overlaps in time and is in the same frequency band. The base station and the UE may each experience self-interference, due to a transmitted signal from the device leaking to (e.g., being received by) a receiver at the same device. The first UE 404*b* may experience additional interference based on one or more signals emitted from a second UE 406*b* and/or a second base station 408*b* in proximity to the first UE 404*b*.

Figure 4C:
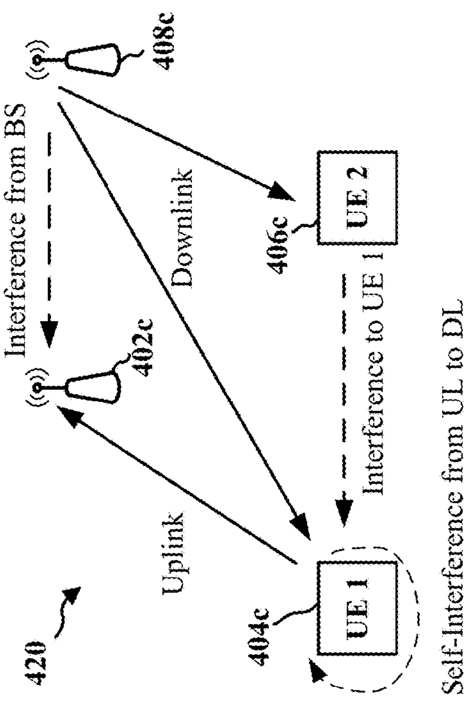

FIG. 4C shows the third example of full-duplex communication 420 in which a first UE 404*c* transmits and receives full-duplex communication with a first base station 402*c* and a second base station 408*c*. The first base station 402*c* and the second base station 408*c* may serve as multiple transmission and reception points (multi-TRPs) for UL and DL communication with the UE 404*c*. The second base station 408*c* may also exchange communication with a second UE 406*c*. In FIG. 4C, the first UE 404*c* may transmit an uplink signal to the first base station 402*c* that overlaps in time with receiving a downlink signal from the second base station 408*c*. The first UE 404*c* may experience self-interference as a result of receiving at least a portion of the first signal when receiving the second signal, e.g., the UE's uplink signal to the base station 402*c* may leak to (e.g., be received by) the UE's receiver when the UE is attempting to receive the signal from the other base station 408*c*. The first UE 404*c* may experience additional interference from the second UE 406*c*.

Figure 4D:
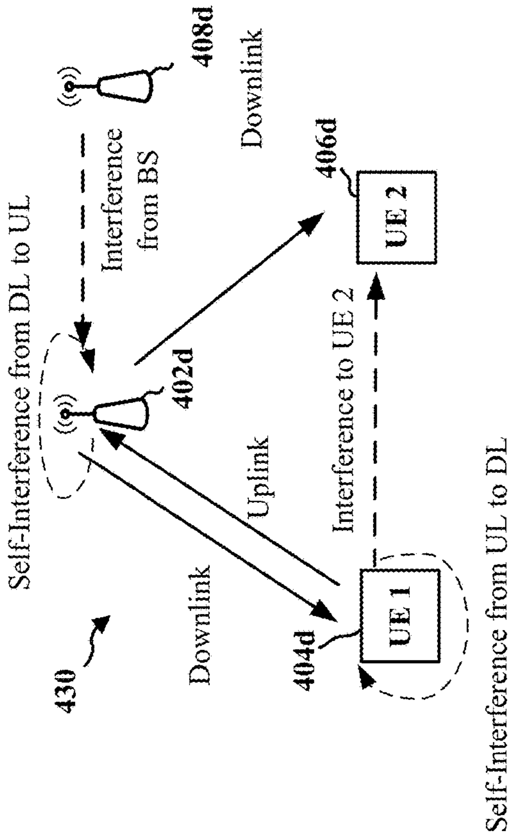

FIG. 4D shows the fourth example of full-duplex communication 430 in which a first base station 402*d* employs full-duplex communication with a first UE 404*d*, and transmits downlink communication to a second UE 406*d*. In this example, the first UE 404*d* is operating in a full-duplex mode, and the second UE 406*d* is operating in a half-duplex mode. The first base station 402*d* and the first UE 404*d* receive and transmit communication that overlaps in time and is in the same frequency band. The base station 402*d* and the first UE 404*d* may each experience self-interference, due to a transmitted signal from the corresponding device leaking to (e.g., being received by) a receiver at the same device. The base station 402*d* may further experience cross link interference due to a signal transmitted by the base station 408*d*. The second UE 406*d* may experience cross-link interference from the uplink transmission of the first UE 404*b* when receiving downlink communication from the base station 402*d*.

Figure 5:
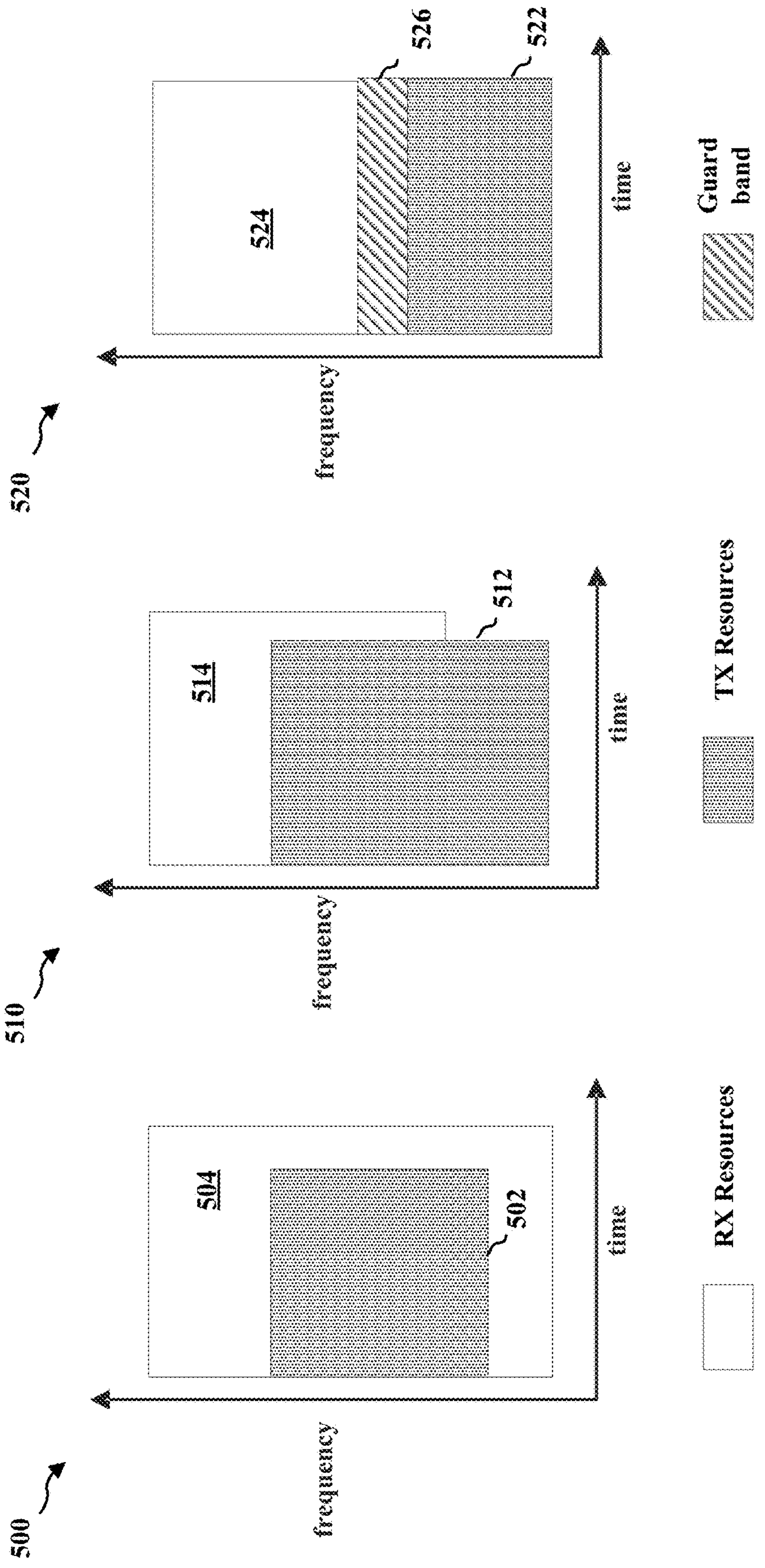
FIG. 5 illustrates examples of in-band full-duplex (IBFD) and sub-band frequency divisional duplex resources.

Full duplex communication may be in the same frequency band. The uplink and downlink communication may be in different frequency sub-bands, in the same frequency sub-band, or in partially overlapping frequency sub-bands. FIG. 5 illustrates a first example 500 and a second example 510 of in-band full-duplex (IBFD) resources and a third example 520 of sub-band full-duplex (SBFD) resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and reception resources that are immediately adjacent to each other may be considered as having a guard band width of 0. As an output signal from a wireless device may extend outside the transmission resources, the guard band may reduce interference experienced by the wireless device. Sub-band FDD may also be referred to as “flexible duplex”.

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

Figure 6:
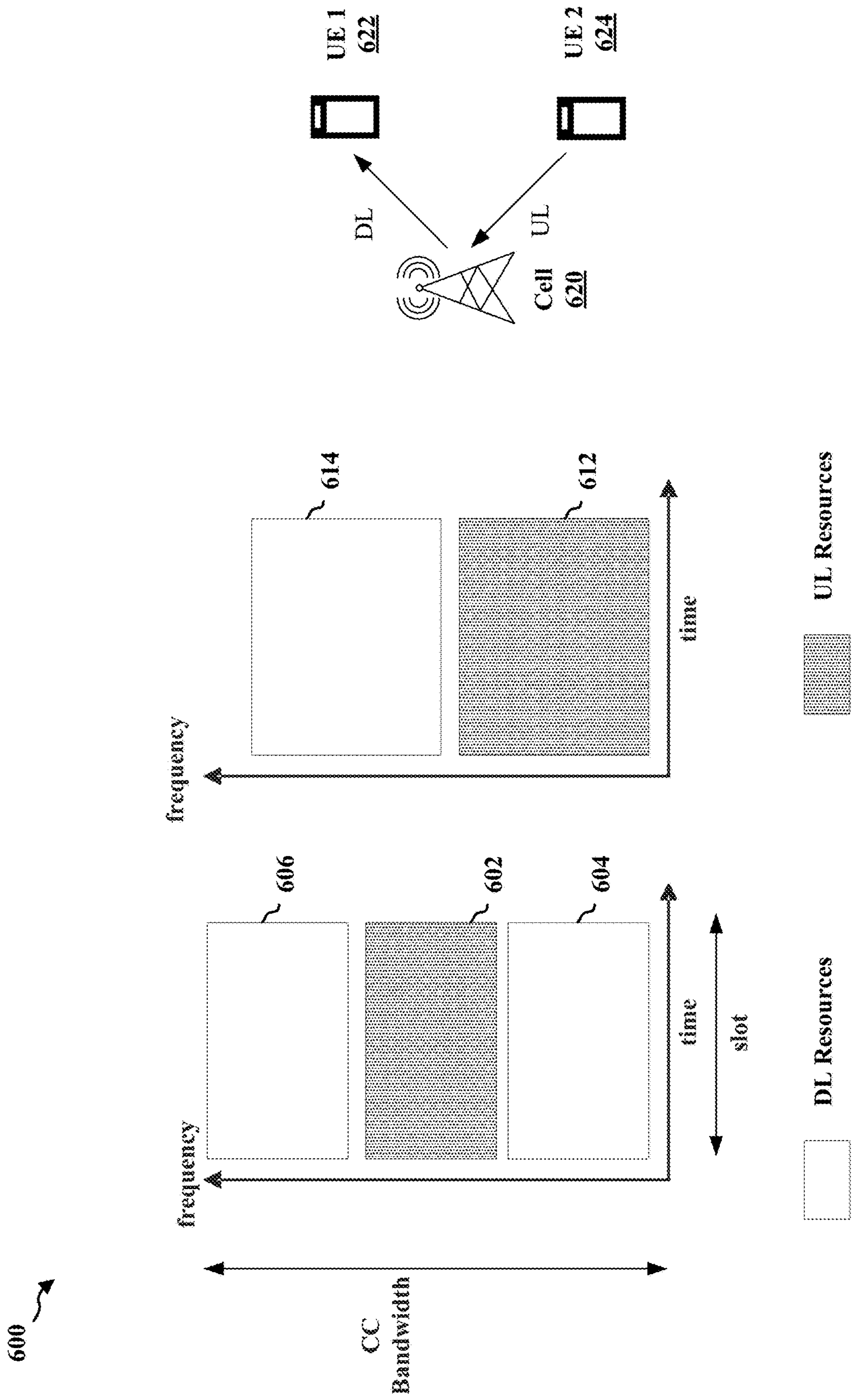
FIG. 6 is a diagram illustrating an example sub-band full-duplex (SBFD) operation.

SBFD supports simultaneous Tx/Rx of DL/UL on a sub-band basis. SBFD may increase the UL duty cycle, leading to latency reduction and improvement in UL coverage. For example, under SBFD, a UL signal may be transmitted in DL slots or flexible slots, and a DL signal may be received in UL slots, leading to latency savings. SBFD may enhance the system capacity, resource utilization, spectrum efficiency, and enable flexible and dynamic UL/DL resource adaption according to UL/DL traffic in a robust manner. FIG. 6 is a diagram 600 illustrating an example SBFD operation. As shown in FIG. 6, a cell 620 may have DL communication with one UE (e.g., UE 1 622), and simultaneously have UL communication with another UE (e.g., UE 2 624) on the same slot. In one example, the DL communication with UE 1 622 may utilize RX resources 604, 606, and the UL communication with UE 2 624 may utilize TX resources 602. In another example, the DL communication with UE 1 622 may utilize RX resources 614, and the UL communication with UE 2 624 may utilize TX resources 612. Although the example is illustrated for multiple downlink sub-bands, aspects presented herein may be similarly applied for multiple uplink sub-bands.

In some instances, a PRG may be determined to be a wideband PRG. In some instances, non-contiguous frequency resources across downlink subbands may be allocated which comprise contiguous frequency resources within each downlink subband. Wideband precoding may occur within each downlink subband. In some instances, non-contiguous frequency resources across downlink subbands may not be allocated, such that only contiguous PRBs (e.g., single subband scheduling) when wideband DMRS precoding is utilized.

As described in connection with FIG. 6, a UE may operate in a half-duplex mode, while a base station communicates in a full-duplex mode. In some aspects, the UE may be aware of the full-duplex communication or operation by the base station. For example, an SBFD aware UE may refer to a UE that is aware of the full-duplex resources or full-duplex communication by the base station in different subbands.

Aspects presented herein provide a configuration for wideband PRG across downlink subbands. For example, a UE may transmit an indication of support for a UE capability indicating support for at least wideband PRG with non-contiguous frequency resources across a plurality of downlink subbands. In some instances, the UE may indicate support for a UE capability associated with wideband PRG with the non-contiguous frequency resources across the plurality of downlink subbands where each of the plurality of downlink subbands comprise contiguous frequency resources. At least one advantage of the disclosure is that UEs that indicate support for wideband PRG across downlink subbands may allow base stations to operate in full duplex which may enhance system capacity, resource utilization, and/or spectrum efficiency.

In some aspects, UEs may be configured to support non-contiguous frequency resources across two DL subbands and comprising an allocation of contiguous frequency resources within each DL subband. However, UEs supporting such feature is based on the UE capability. For example, UEs may report a new UE capability indicating that the UE may support wideband PRG with non-contiguous frequency resources across two DL subbands and contiguous frequency resource within each DL subband allocation. In such instances, the UE may comprise a subband full duplex aware UE. For subband full duplex aware UEs, such UE may report a new UE capability indicating that precoding across the two downlink subbands may be different. For example, a UE may process each downlink subband separately without joint decoding and/or channel estimation (CE). In some aspects, the UE may report a new UE capability that precoding across the two downlink subbands may be the same. For example, in such instances, the UE may process each downlink subband using joint decoding and/or CE. The correlation may be assumed between the downlink subbands. In some instances, the UE capability may be defined for a threshold to assume that the same precoding is utilized across the downlink subbands. For example, the threshold may correspond to a frequency space between two downlink subbands to not be larger than N MHz or M RBs in order to maintain the correlation between the two downlink subbands.

In some aspects, if a UE supports a UE capability that precoding across downlink subbands may be the same and may be different, then a base station may provide a precoding indication to the UE (e.g., subband full duplex aware UE) that indicates which precoding is utilized or assumed, such that the UE knows whether the same or different precoding is utilized across the downlink subbands and CE is joint or separate across the downlink subbands. In such instances, the precoding indication from the base station may be comprised in a scheduling DCI that schedules PDSCH and may comprise a new field for the precoding indication. In some aspects, the precoding indication may be RRC configured for one or more scheduled PDSCHs. In some instances, a default precoding may be utilized if a precoding indication is not provided/received, such that the default precoding may indicate that the precoding across the downlink subbands is the same or different.

Figure 7:
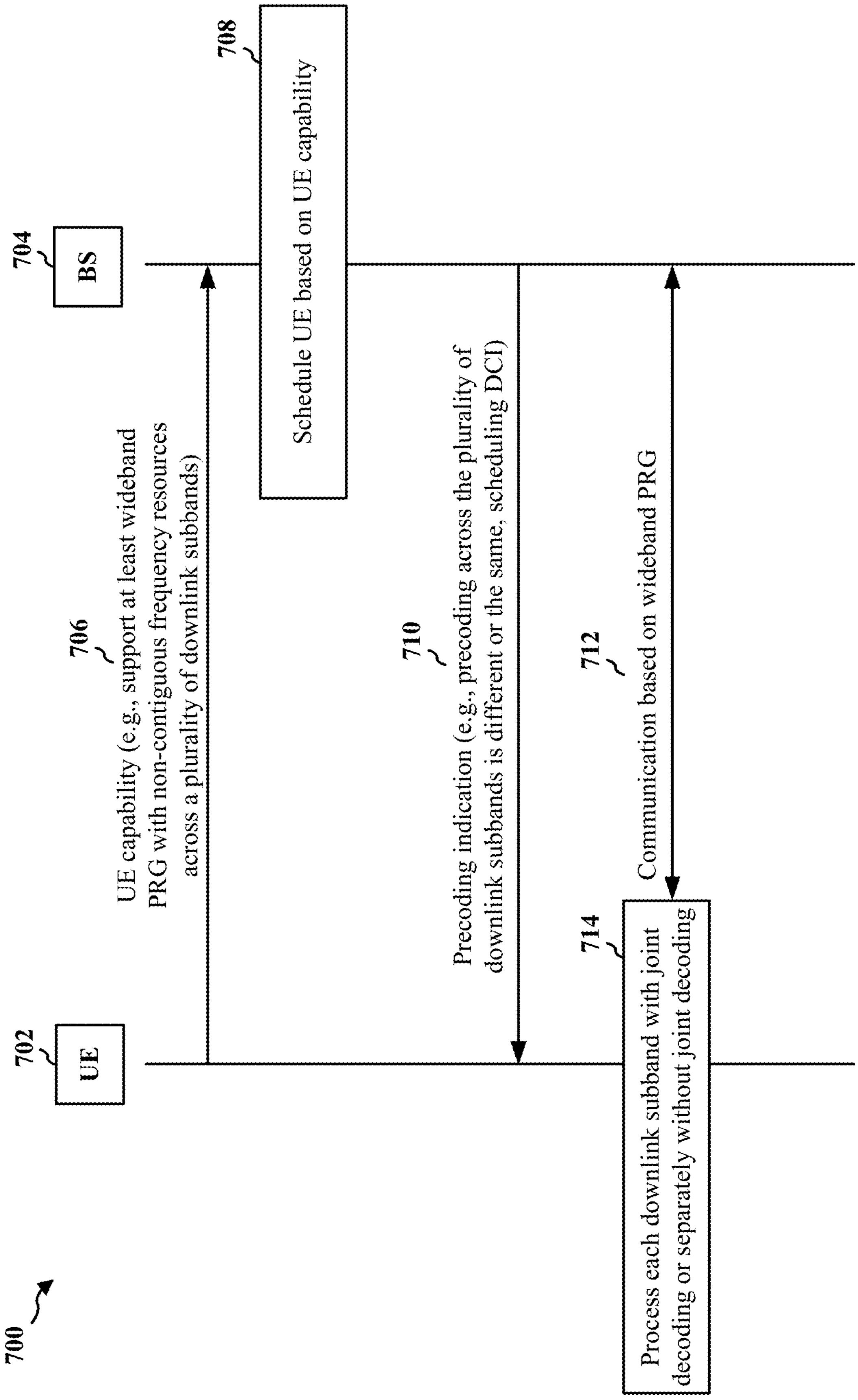
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102 and the UE 702 may correspond to at least UE 104. In another example, in the context of FIG. 3, the base station 704 may correspond to base station 310 and the UE 702 may correspond to UE 350.

At 706, the UE 702 may transmit a UE capability indicating support for at least wideband PRG with non-contiguous frequency resources across a plurality of downlink subbands. The UE may transmit the UE capability to the base station 704. The base station 704 may obtain the UE capability from the UE 702. In some aspects, the UE may comprise a subband full duplex aware UE. The subband full duplex aware UE may support knowledge of subband full duplex operation of the network entity using the plurality downlink subbands that overlap in time one or more uplink subbands. In some aspects, the UE capability may indicate support for wideband PRG with the non-contiguous frequency resources across the plurality of downlink subbands and contiguous frequency resources with each of the plurality of downlink subbands. In some aspects, the UE capability indicates support for at least one of a different precoding across the plurality of downlink subbands, or a same precoding across the plurality of downlink subbands. In some aspects, a default precoding may be set. For example, the default precoding may be set such that the precoding across the plurality of downlink subbands is different. In another example, the default precoding may be set such that the precoding across the plurality of downlink subbands is the same.

As shown at 708, the base station may then schedule the UE 702 based on the capability supported by the UE. For example, the base station may schedule the UE with reception and/or transmission resources based on a wideband PRG with non-contiguous frequency resources across multiple sub-bands at a same time.

At 710, the base station 704 may provide a precoding indication indicating that the precoding across the plurality of downlink subbands is different or the same. The base station may provide the precoding indication indicating that the precoding across the plurality of downlink subbands is different or the same to the UE 702. The UE 702 may receive the precoding indication from the base station 704. In some aspects, the precoding indication may be comprised within a scheduling DCI. In some aspects, the scheduling DCI may comprise a field corresponding to the precoding indication. In some aspects, the precoding indication may be comprised within RRC signaling for all scheduled PDSCHs.

At 714, the UE 702 may process each downlink subband with joint decoding or separately without joint decoding. In some instances, the UE 702 may process each downlink subband with joint decoding. The UE may process each of the downlink subbands with joint decoding in response to the UE capability indicating the support for the same precoding across the plurality of downlink subbands. In some aspects, the UE capability may be associated with a frequency separation space between the plurality of downlink subbands that does not exceed a threshold. For example, a frequency space between two downlink subbands of the plurality of downlink subbands may not exceed more than N MHz or M RBs per SCS or per frequency range in order to maintain a correlation between the two downlink subbands. In some instances, the UE 702 may process each downlink subband separately without joint decoding. The UE may process each of the downlink subband separately without joint decoding in response to the UE capability indicating the support for the different precoding across the plurality of downlink subbands.

At 712, the UE 702 and the base station 704 may communicate with each other (transmit and/or receive communication) based on the wideband PRG scheduling indicated in the DCI.

Figure 8:
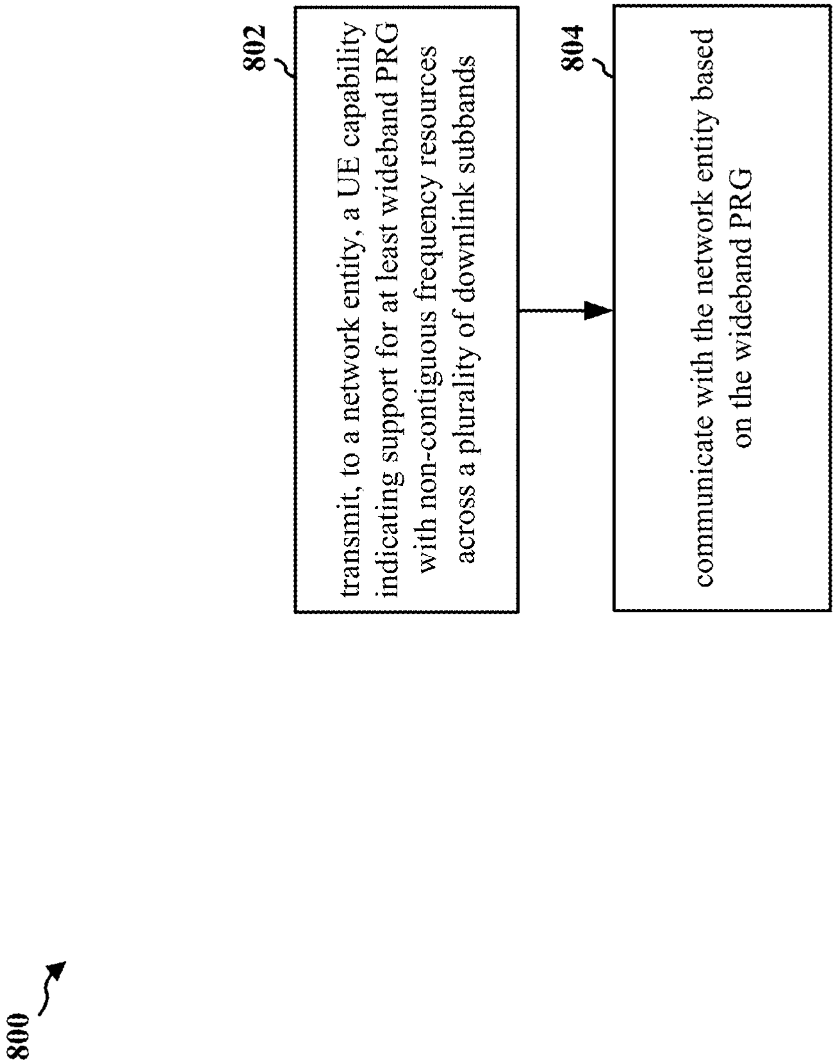
FIG. 8 is a flowchart of a method of wireless communication.

FIG. 8 is a flowchart 800 of a method of wireless communication. The method may be performed by a UE (e.g., the UE 104; the apparatus 1004). One or more of the illustrated operations may be omitted, transposed, or contemporaneous. The method may allow a UE to communicate with a base station based on wideband PRG for UEs that support wideband PRG. The aspects presented herein enable better coordination between a network and a UE to enable accurate wideband PRG communication over non-contiguous frequency sub-bands using various potential types of precoding.

At 802, the UE may transmit a UE capability indicating support for at least wideband PRG with non-contiguous frequency resources across a plurality of downlink subbands. For example, 802 may be performed by capability component 198 of apparatus 1004. The UE may transmit the UE capability to a network entity. In some aspects, the UE may comprise a subband full duplex aware UE. The subband full duplex aware UE may support knowledge of subband full duplex operation of the network entity using the plurality downlink subbands that overlap in time one or more uplink subbands. In some aspects, the UE capability may indicate support for wideband PRG with the non-contiguous frequency resources across the plurality of downlink subbands and contiguous frequency resources with each of the plurality of downlink subbands. In some aspects, the UE capability indicates support for at least one of a different precoding across the plurality of downlink subbands, or a same precoding across the plurality of downlink subbands. In some aspects, a default precoding may be set. For example, the default precoding may be set such that the precoding across the plurality of downlink subbands is different. In another example, the default precoding may be set such that the precoding across the plurality of downlink subbands is the same.

At 804, the UE may communicate based on the wideband PRG. For example, 804 may be performed by capability component 198 of apparatus 1004. The UE may communicate with the network entity based on the wideband PRG.

Figure 9:
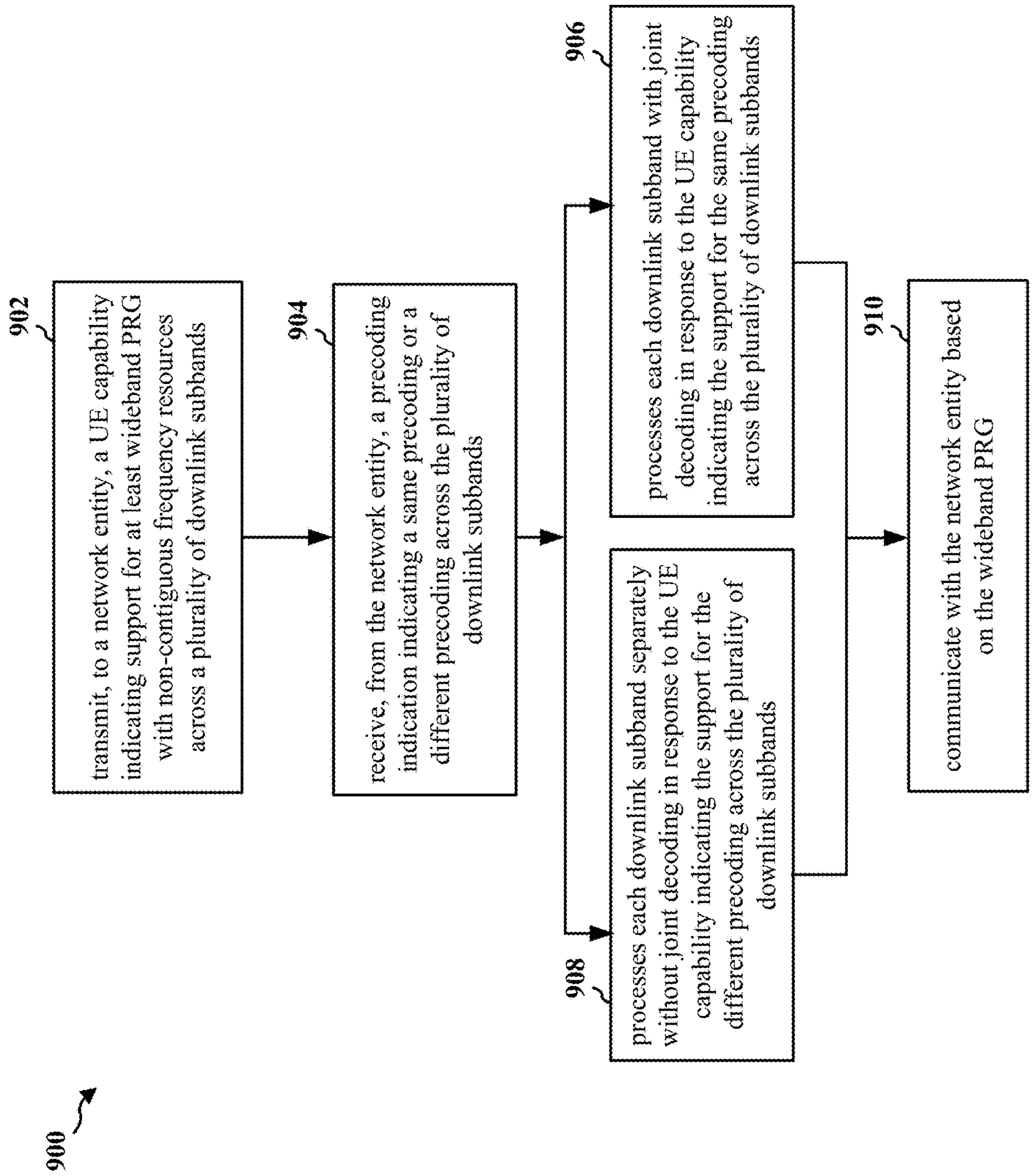
FIG. 9 is a flowchart of a method of wireless communication.

FIG. 9 is a flowchart 900 of a method of wireless communication. The method may be performed by a UE (e.g., the UE 104; the apparatus 1004). One or more of the illustrated operations may be omitted, transposed, or contemporaneous. The method may allow a UE to communicate with a base station based on wideband PRG for UEs that support wideband PRG. The aspects presented herein enable better coordination between a network and a UE to enable accurate wideband PRG communication over non-contiguous frequency sub-bands using various potential types of precoding.

At 902, the UE may transmit a UE capability indicating support for at least wideband PRG with non-contiguous frequency resources across a plurality of downlink subbands. For example, 902 may be performed by capability component 198 of apparatus 1004. The UE may transmit the UE capability to a network entity. In some aspects, the UE may comprise a subband full duplex aware UE. The subband full duplex aware UE may support knowledge of subband full duplex operation of the network entity using the plurality downlink subbands that overlap in time one or more uplink subbands. In some aspects, the UE capability may indicate support for wideband PRG with the non-contiguous frequency resources across the plurality of downlink subbands and contiguous frequency resources with each of the plurality of downlink subbands. In some aspects, the UE capability indicates support for at least one of a different precoding across the plurality of downlink subbands, or a same precoding across the plurality of downlink subbands. In some aspects, a default precoding may be set. For example, the default precoding may be set such that the precoding across the plurality of downlink subbands is different. In another example, the default precoding may be set such that the precoding across the plurality of downlink subbands is the same.

At 904, the UE may receive a precoding indication indicating the same precoding or the different precoding across the plurality of downlink subbands. For example, 904 may be performed by capability component 198 of apparatus 1004. The UE may receive the precoding indication indicating the same precoding or the different precoding across the plurality of downlink subbands from the network entity. In some aspects, the precoding indication may be comprised within a scheduling DCI. In some aspects, the scheduling DCI may comprise a field corresponding to the precoding indication. In some aspects, the precoding indication may be comprised within RRC signaling for all scheduled PDSCHs.

At 908, the UE may process each downlink subband separately without joint decoding. For example, 908 may be performed by capability component 198 of apparatus 1004. The UE may process each of the downlink subband separately without joint decoding in response to the UE capability indicating the support for the different precoding across the plurality of downlink subbands.

At 906, the UE may process each downlink subband with joint decoding. For example, 906 may be performed by capability component 198 of apparatus 1004. The UE may process each of the downlink subbands with joint decoding in response to the UE capability indicating the support for the same precoding across the plurality of downlink subbands. In some aspects, the UE capability may be associated with a frequency separation space between the plurality of downlink subbands that does not exceed a threshold. For example, a frequency space between two downlink subbands of the plurality of downlink subbands may not exceed more than N MHz or M RBs per SCS or per frequency range in order to maintain a correlation between the two downlink subbands.

At 910, the UE may communicate based on the wideband PRG. For example, 910 may be performed by capability component 198 of apparatus 1004. The UE may communicate with the network entity based on the wideband PRG.

Figure 10:
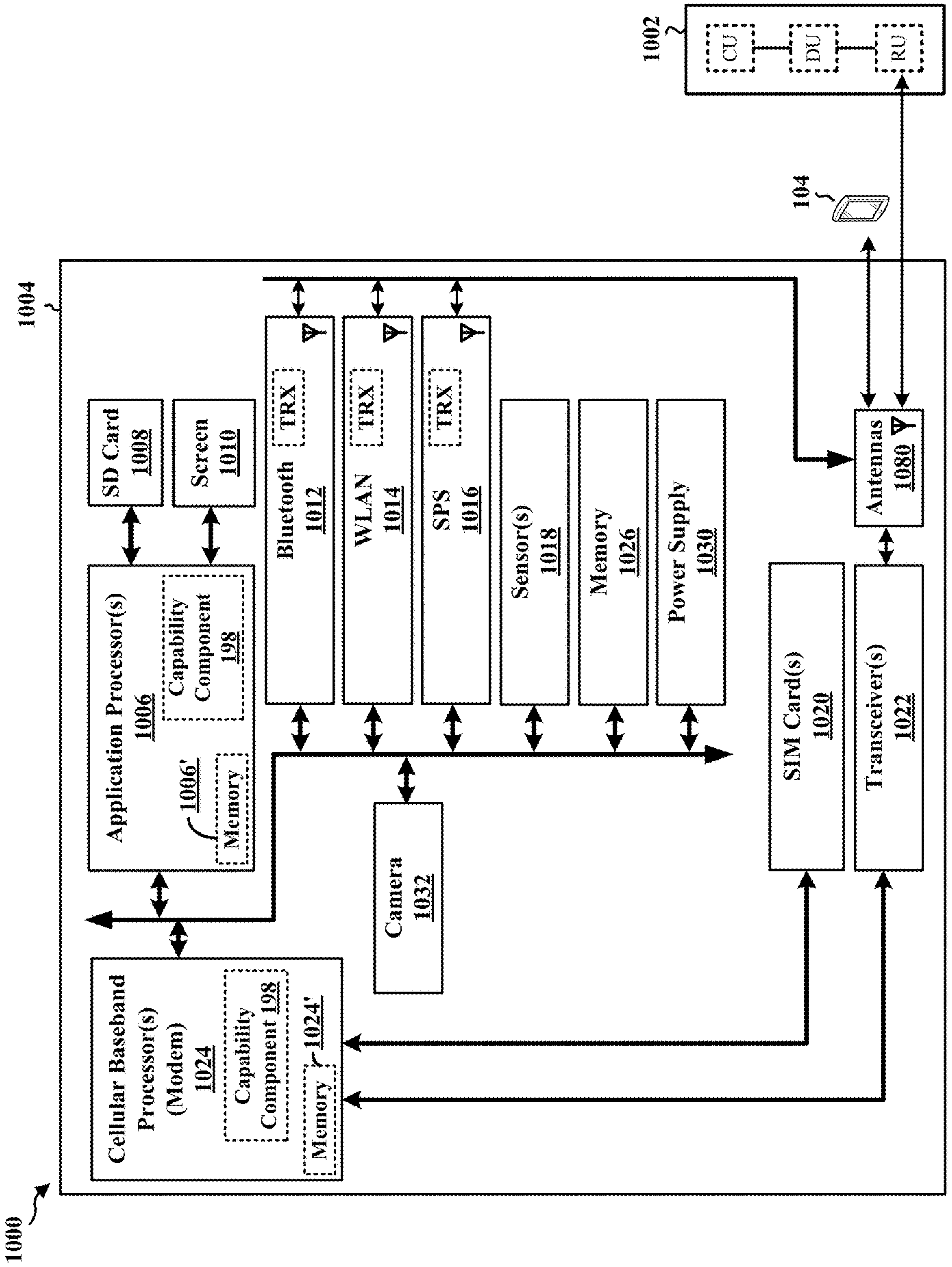
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) 1024 communicates through the transceiver(s) 1022 via one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor (s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see UE 350 of FIG. 3) and include the additional modules of the apparatus 1004.

As discussed supra, the component 198 may be configured to transmit, to a network entity, a UE capability indicating support for at least wideband PRG with non-contiguous frequency resources across a plurality of downlink subbands; and communicate with the network entity based on the wideband PRG. The component 198 may be within the cellular baseband processor(s) 1024, the application processor(s) 1006, or both the cellular baseband processor(s) 1024 and the application processor(s) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for transmitting, to a network entity, a UE capability indicating support for at least wideband PRG with non-contiguous frequency resources across a plurality of downlink subbands. The apparatus includes means for communicating with the network entity based on the wideband PRG. The apparatus further includes means for processing each downlink subband separately without joint decoding in response to the UE capability indicating the support for the different precoding across the plurality of downlink subbands. The apparatus further includes means for processing each downlink subband with joint decoding in response to the UE capability indicating the support for the same precoding across the plurality of downlink subbands. The apparatus further includes means for receiving, from the network entity, a precoding indication indicating the same precoding or the different precoding across the plurality of downlink subbands. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
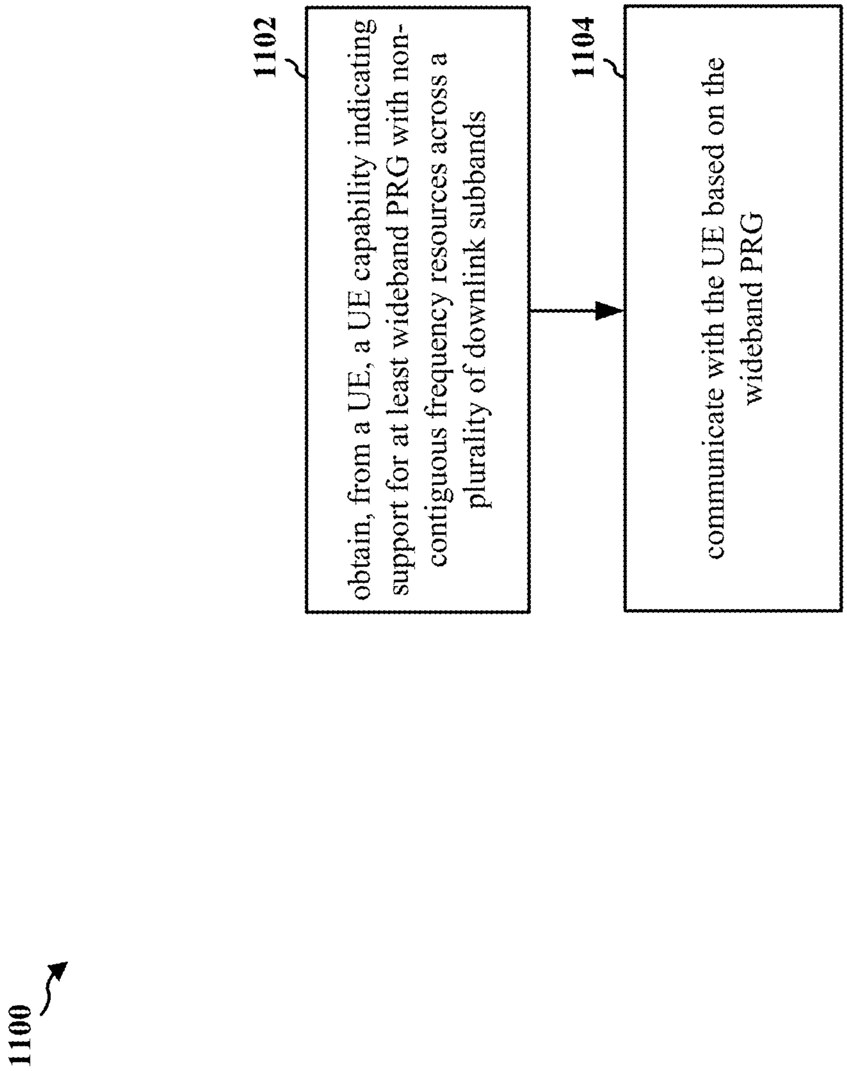
FIG. 11 is a flowchart of a method of wireless communication.

FIG. 11 is a flowchart 1100 of a method of wireless communication. The method may be performed by a base station (e.g., the base station 102; the network entity 1002, 1302). One or more of the illustrated operations may be omitted, transposed, or contemporaneous. The method may allow a base station to communicate based on wideband PRG for UEs that support wideband PRG. The aspects presented herein enable better coordination between a network and a UE to enable accurate wideband PRG communication over non-contiguous frequency sub-bands using various potential types of precoding.

At 1102, the network entity may obtain a UE capability indicating support for at least wideband PRG with non-contiguous frequency resources across a plurality of downlink subbands. For example, 1102 may be performed by capability component 199 of network entity 1302. The network entity may obtain the UE capability from a UE. In some aspects, the UE may comprise a subband full duplex aware UE. The subband full duplex aware UE may support knowledge of subband full duplex operation of the network entity using the plurality downlink subbands that overlap in time one or more uplink subbands. In some aspects, the UE capability may indicate support for wideband PRG with the non-contiguous frequency resources across the plurality of downlink subbands and contiguous frequency resources with each of the plurality of downlink subbands. In some aspects, the UE capability indicates support for at least one of a different precoding across the plurality of downlink subbands, or a same precoding across the plurality of downlink subbands.

At 1104, the network entity may communicate based on the wideband PRG. For example, 1104 may be performed by capability component 199 of network entity 1302. The network entity may communicate with the UE based on the wideband PRG.

Figure 12:
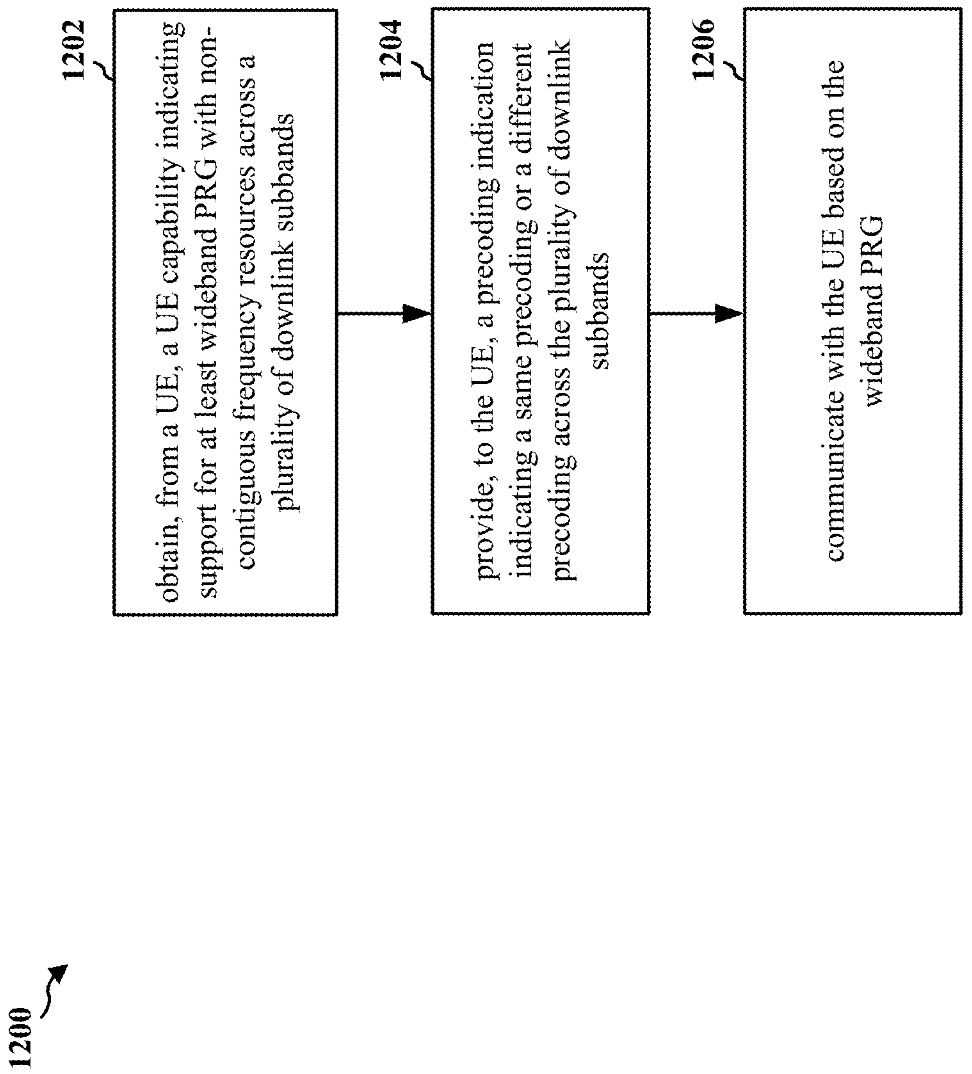
FIG. 12 is a flowchart of a method of wireless communication.

FIG. 12 is a flowchart 1200 of a method of wireless communication. The method may be performed by a base station (e.g., the base station 102; the network entity 1002, 1302). One or more of the illustrated operations may be omitted, transposed, or contemporaneous. The method may allow a base station to communicate based on wideband PRG for UEs that support wideband PRG. The aspects presented herein enable better coordination between a network and a UE to enable accurate wideband PRG communication over non-contiguous frequency sub-bands using various potential types of precoding.

At 1202, the network entity may obtain a UE capability indicating support for at least wideband PRG with non-contiguous frequency resources across a plurality of downlink subbands. For example, 1202 may be performed by capability component 199 of network entity 1302. The network entity may obtain the UE capability from a UE. In some aspects, the UE may comprise a subband full duplex aware UE. The subband full duplex aware UE may support knowledge of subband full duplex operation of the network entity using the plurality downlink subbands that overlap in time one or more uplink subbands. In some aspects, the UE capability may indicate support for wideband PRG with the non-contiguous frequency resources across the plurality of downlink subbands and contiguous frequency resources with each of the plurality of downlink subbands. In some aspects, the UE capability indicates support for at least one of a different precoding across the plurality of downlink subbands, or a same precoding across the plurality of downlink subbands.

At 1204, the network entity may provide a precoding indication indicating that the precoding across the plurality of downlink subbands is different or the same. For example, 1204 may be performed by capability component 199 of network entity 1302. The network entity may provide the precoding indication indicating that the precoding across the plurality of downlink subbands is different or the same to the UE. In some aspects, the precoding indication may be comprised within a scheduling DCI. In some aspects, the scheduling DCI may comprise a field corresponding to the precoding indication. In some aspects, the precoding indication may be comprised within RRC signaling for all scheduled PDSCHs.

At 1206, the network entity may communicate based on the wideband PRG. For example, 1206 may be performed by capability component 199 of network entity 1302. The network entity may communicate with the UE based on the wideband PRG.

Figure 13:
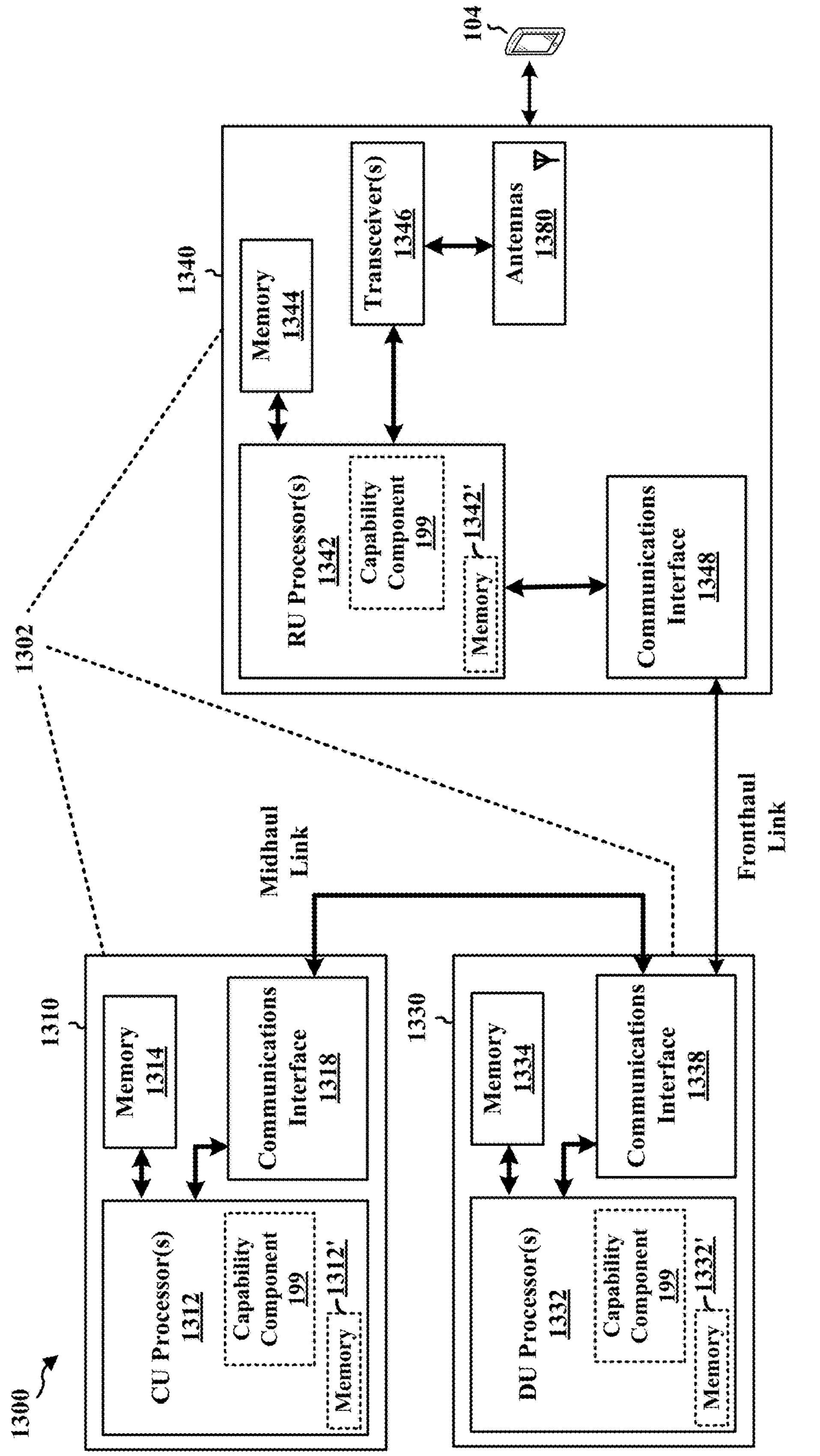
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface.

The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to obtain, from a UE, a UE capability indicating support for at least wideband PRG with non-contiguous frequency resources across a plurality of downlink subbands; and communicate with the UE based on the wideband PRG. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for obtaining, from a UE, a UE capability indicating support for at least wideband PRG with non-contiguous frequency resources across a plurality of downlink subbands. The network entity may include means for communicating with the UE based on the wideband PRG. The network entity may further include means for providing, to the UE, a precoding indication indicating the same precoding or the different precoding across the plurality of downlink subbands. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C. B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising transmitting, to a network entity, a UE capability indicating support for at least wideband PRG with non-contiguous frequency resources across a plurality of downlink subbands; and communicate with the network entity based on the wideband PRG.

Aspect 2 is the method of aspect 1, further includes that the UE comprises a subband full duplex aware UE.

Aspect 3 is the method of any of aspects 1 and 2, further includes that the subband full duplex aware UE supports knowledge of subband full duplex operation of the network entity using the plurality downlink subbands that overlap in time one or more uplink subbands.

Aspect 4 is the method of any of aspects 1-3, further includes that the UE capability indicates the support for wideband PRG with the non-contiguous frequency resources across the plurality of downlink subbands and contiguous frequency resources with each of the plurality of downlink subbands.

Aspect 5 is the method of any of aspects 1-4, further includes that the UE capability indicates the support for at least one of different precoding across the plurality of downlink subbands, or a same precoding across the plurality of downlink subbands.

Aspect 6 is the method of any of aspects 1-5, further including processing each downlink subband separately without joint decoding in response to the UE capability indicating the support for the different precoding across the plurality of downlink subbands.

Aspect 7 is the method of any of aspects 1-6, further including processing each downlink subband with joint decoding in response to the UE capability indicating the support for the same precoding across the plurality of downlink subbands.

Aspect 8 is the method of any of aspects 1-7, further includes that the UE capability is associated with a frequency separation space between the plurality of downlink subbands that does not exceed a threshold.

Aspect 9 is the method of any of aspects 1-8, further including receiving, from the network entity, a precoding indication indicating the same precoding or the different precoding across the plurality of downlink subbands.

Aspect 10 is the method of any of aspects 1-9, further includes that the precoding indication is comprised within a scheduling DCI, wherein the scheduling DCI comprises a field corresponding to the precoding indication.

Aspect 11 is the method of any of aspects 1-10, further includes that the precoding indication is comprised within a RRC signaling for all scheduled PDSCHs.

Aspect 12 is the method of any of aspects 1-11, further includes that a default precoding is set such that the same precoding or the different precoding across the plurality of downlink subbands.

Aspect 13 is an apparatus for wireless communication at a UE including at least one processor coupled to a memory and at least one transceiver, the at least one processor configured to implement any of Aspects 1-12.

Aspect 14 is an apparatus for wireless communication at a UE including means for implementing any of Aspects 1-12.

Aspect 15 is a computer-readable medium storing computer executable code, where the code when executed by a processor causes the processor to implement any of Aspects 1-12.

Aspect 16 is a method of wireless communication at a network entity comprising obtaining, from a UE, a UE capability indicating support for at least wideband PRG with non-contiguous frequency resources across a plurality of downlink subbands; and communicating with the UE based on the wideband PRG.

Aspect 17 is the method of aspect 16, further includes that the UE comprises a subband full duplex aware UE.

Aspect 18 is the method of any of aspects 16 and 17, further includes that the subband full duplex aware UE supports knowledge of subband full duplex operation of the network entity using the plurality downlink subbands that overlap in time one or more uplink subbands.

Aspect 19 is the method of any of aspects 16-18, further includes that the UE capability indicates the support for wideband PRG with the non-contiguous frequency resources across the plurality of downlink subbands and contiguous frequency resources with each of the plurality of downlink subbands.

Aspect 20 is the method of any of aspects 16-19, further includes that wherein the UE capability indicates the support for at least one of different precoding across the plurality of downlink subbands, or a same precoding across the plurality of downlink subbands.

Aspect 21 is the method of any of aspects 16-20, further including providing, to the UE, a precoding indication indicating the same precoding or the different precoding across the plurality of downlink subbands.

Aspect 22 is the method of any of aspects 16-21, further includes that the precoding indication is comprised within a scheduling DCI, wherein the scheduling DCI comprises a field corresponding to the precoding indication.

Aspect 23 is the method of any of aspects 16-22, further includes that the precoding indication is comprised within a RRC signaling for all scheduled PDSCHs.

Aspect 24 is an apparatus for wireless communication at a network entity including at least one processor coupled to a memory and at least one transceiver, the at least one processor configured to implement any of Aspects 16-23.

Aspect 27 is an apparatus for wireless communication at a network entity including means for implementing any of Aspects 16-23.

Aspect 28 is a computer-readable medium storing computer executable code, where the code when executed by a processor causes the processor to implement any of Aspects 16-23.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the apparatus to:

transmit, to a network entity, a UE capability indicating support for at least wideband precoding resource group (PRG) with non-contiguous frequency resources across a plurality of downlink subbands, wherein the UE capability indicates the support for at least one of:

different precoding across the plurality of downlink subbands, or a same precoding across the plurality of downlink subbands, wherein the UE capability is associated with a frequency separation space between the plurality of downlink subbands that does not exceed a threshold; and communicate with the network entity based on the wideband PRG.

2. The apparatus of claim 1, further comprising a transceiver coupled to the at least one processor, the transceiver being configured to:

transmit, to the network entity, the UE capability indicating the support for the wideband PRG with the non-contiguous frequency resources across the plurality of downlink subbands; and communicate with the network entity based on the wideband PRG.

3. The apparatus of claim 1, wherein the UE comprises a subband full duplex aware UE.

4. The apparatus of claim 3, wherein the subband full duplex aware UE supports knowledge of subband full duplex operation of the network entity using the plurality of downlink subbands that overlap in time one or more uplink subbands.

5. The apparatus of claim 1, wherein the UE capability indicates the support for wideband PRG with the non-contiguous frequency resources across the plurality of downlink subbands and contiguous frequency resources within each of the plurality of downlink subbands.

6. The apparatus of claim 1, wherein the UE capability indicates the support for the different precoding across the plurality of downlink subbands.

7. The apparatus of claim 6, wherein the at least one processor is configured to cause the apparatus to:

process each downlink subband separately without joint decoding in response to the UE capability indicating the support for the different precoding across the plurality of downlink subbands.

8. The apparatus of claim 1, wherein the at least one processor is configured to cause the apparatus to:

process each downlink subband with joint decoding in response to the UE capability indicating the support for the same precoding across the plurality of downlink subbands.

9. The apparatus of claim 1, wherein the at least one processor is configured to cause the apparatus to:

receive, from the network entity, a precoding indication indicating the same precoding or the different precoding across the plurality of downlink subbands.

10. The apparatus of claim 9, wherein the precoding indication is comprised within a scheduling downlink control information (DCI), wherein the scheduling DCI comprises a field corresponding to the precoding indication.

11. The apparatus of claim 9, wherein the precoding indication is comprised within a radio resource configuration (RRC) signaling for all scheduled physical downlink shared channels (PDSCHs).

12. The apparatus of claim 1, wherein a default precoding is set such that the same precoding or the different precoding across the plurality of downlink subbands.

13. A method of wireless communication at a user equipment (UE), comprising:

transmitting, to a network entity, a UE capability indicating support for at least wideband precoding resource group (PRG) with non-contiguous frequency resources across a plurality of downlink subbands, wherein the UE capability indicates the support for at least one of:

different precoding across the plurality of downlink subbands, or a same precoding across the plurality of downlink subbands, wherein the UE capability is associated with a frequency separation space between the plurality of downlink subbands that does not exceed a threshold; and communicating with the network entity based on the wideband PRG.

14. The method of claim 13, wherein the UE capability indicates the support for the different precoding across the plurality of downlink subbands.

15. The method of claim 14, further comprising:

processing each downlink subband separately without joint decoding in response to the UE capability indicating the support for the different precoding across the plurality of downlink subbands.

16. The method of claim 13, further comprising:

processing each downlink subband with joint decoding in response to the UE capability indicating the support for the same precoding across the plurality of downlink subbands.

17. The method of claim 13, further comprising:

receiving, from the network entity, a precoding indication indicating the same precoding or the different precoding across the plurality of downlink subbands.

18. An apparatus for wireless communication at a network entity, comprising:

at least one memory; and at least one processor coupled to the at least one memory and, based at least in part on information stored in the at least one memory, the at least one processor is configured to cause the apparatus to:

obtain, from a user equipment (UE), a UE capability indicating support for at least wideband precoding resource group (PRG) with non-contiguous frequency resources across a plurality of downlink subbands, wherein the UE capability indicates the support for at least one of:

different precoding across the plurality of downlink subbands, or a same precoding across the plurality of downlink subbands, wherein the UE capability is associated with a frequency separation space between the plurality of downlink subbands that does not exceed a threshold; and communicate with the UE based on the wideband PRG.

19. The apparatus of claim 18, further comprising a transceiver coupled to the at least one processor, the transceiver being configured to:

obtain, from the UE, the UE capability indicating the support for at least the wideband PRG with the non-contiguous frequency resources across the plurality of downlink subbands; and communicate with the UE based on the wideband PRG.

20. The apparatus of claim 18, wherein the UE comprises a subband full duplex aware UE.

21. The apparatus of claim 20, wherein the subband full duplex aware UE supports knowledge of subband full duplex operation of the network entity using the plurality of downlink subbands that overlap in time one or more uplink subbands.

22. The apparatus of claim 18, wherein the UE capability indicates the support for wideband PRG with the non-contiguous frequency resources across the plurality of downlink subbands and contiguous frequency resources within each of the plurality of downlink subbands.

23. The apparatus of claim 18, wherein the UE capability indicates the support for the different precoding across the plurality of downlink subbands.

24. The apparatus of claim 18, wherein the at least one processor is configured to cause the apparatus to:

provide, to the UE, a precoding indication indicating the same precoding or the different precoding across the plurality of downlink subbands.

25. The apparatus of claim 24, wherein the precoding indication is comprised within a scheduling downlink control information (DCI), wherein the scheduling DCI comprises a field corresponding to the precoding indication.

26. The apparatus of claim 24, wherein the precoding indication is comprised within a radio resource configuration (RRC) signaling for all scheduled physical downlink shared channels (PDSCHs).

27. A method of wireless communication at a network entity, comprising:

obtaining, from a user equipment (UE), a UE capability indicating support for at least wideband precoding resource group (PRG) with non-contiguous frequency resources across a plurality of downlink subbands, wherein the UE capability indicates the support for at least one of:

different precoding across the plurality of downlink subbands, or a same precoding across the plurality of downlink subbands, wherein the UE capability is associated with a frequency separation space between the plurality of downlink subbands that does not exceed a threshold; and communicating with the UE based on the wideband PRG.

28. The method of claim 27, wherein the UE capability indicates the support for the different precoding across the plurality of downlink subbands.

29. The method of claim 27, further comprising:

providing, to the UE, a precoding indication indicating the same precoding or the different precoding across the plurality of downlink subbands.

* * * * *